(12) United States Patent
Ichimei et al.

(10) Patent No.: US 12,339,529 B2
(45) Date of Patent: Jun. 24, 2025

(54) OPTICAL MODULATOR AND OPTICAL TRANSMISSION DEVICE USING SAME

(71) Applicant: SUMITOMO OSAKA CEMENT CO., LTD., Tokyo (JP)

(72) Inventors: Hideki Ichimei, Tokyo (JP); Minoru Shinozaki, Tokyo (JP); Yu Kataoka, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 78 days.

(21) Appl. No.: 18/025,843

(22) PCT Filed: Jan. 26, 2022

(86) PCT No.: PCT/JP2022/002955
§ 371 (c)(1),
(2) Date: Mar. 10, 2023

(87) PCT Pub. No.: WO2022/163724
PCT Pub. Date: Aug. 4, 2022

(65) Prior Publication Data
US 2023/0350235 A1    Nov. 2, 2023

(30) Foreign Application Priority Data
Jan. 29, 2021  (JP) ................................. 2021-013606

(51) Int. Cl.
*G02F 1/01*     (2006.01)

(52) U.S. Cl.
CPC .......... *G02F 1/0113* (2021.01); *G02F 1/0102* (2013.01); *G02F 1/0121* (2013.01)

(58) Field of Classification Search
CPC .... G02F 1/0113; G02F 1/0102; G02F 1/0121; G02F 1/0212; G02F 1/2255
See application file for complete search history.

(56) References Cited

U.S. PATENT DOCUMENTS 4,958,898 A *  9/1990  Friedman ................ G02F 1/025
                                                    257/350
9,335,570 B2 *  5/2016  Katou ..................... G02F 1/035
(Continued)

FOREIGN PATENT DOCUMENTS

JP    H51993289034 A    11/1993
JP    2006-284838 A     10/2006
(Continued)

*Primary Examiner* — Uyen Chau N Le
*Assistant Examiner* — Eric Paul Struth
(74) *Attorney, Agent, or Firm* — IpHorgan Ltd.

(57) ABSTRACT

An optical modulator with which electrical connection between a signal electrode and signal wiring of a wiring substrate can be reliably made even in a case where a width of the signal electrode in an action portion of an optical control substrate is narrow is provided. An optical modulator includes an optical control substrate (1) that includes an optical waveguide (OW) including at least a branched waveguide which branches one light wave into two light waves, and that includes a control electrode for applying an electrical field to the branched waveguide, and a wiring substrate provided with a wiring which relays an electrical signal to be applied to the control electrode or with a wiring which terminates the electrical signal, in which the control electrode is provided with a signal electrode(S), the wiring is provided with signal wiring, and in a part (Sc) in which electrical connection is made between the signal electrode(S) and the signal wiring, a clearance (W1) in which the branched waveguide (OW) sandwiches the signal electrode is wider than a clearance (W2) in which the branched waveguide sandwiches the signal electrode in an action portion in which the control electrode applies the electrical field to the branched waveguide.

7 Claims, 9 Drawing Sheets

(56) References Cited

U.S. PATENT DOCUMENTS

| | | | |
|---|---|---|---|
| 10,061,179 B2* | 8/2018 | Miyazaki | H04B 10/505 |
| 10,788,689 B1* | 9/2020 | Lentine | G02F 1/0356 |
| 2015/0063809 A1 | 3/2015 | Sugiyama | |
| 2018/0341164 A1* | 11/2018 | Williams | G02F 1/2257 |
| 2019/0018262 A1* | 1/2019 | Nejadmalayeri | G02F 1/01 |
| 2023/0046152 A1* | 2/2023 | Grote | G01K 1/14 |

FOREIGN PATENT DOCUMENTS

| | | | | |
|---|---|---|---|---|
| JP | 2011209456 A | 10/2011 | | |
| JP | 5494704 B2 | 5/2014 | | |
| JP | 2014191250 A | 10/2014 | | |
| JP | 2015045790 A | 3/2015 | | |
| WO | WO-2015193981 A1 * | 12/2015 | | G02B 6/12 |

* cited by examiner

OPTICAL MODULATOR AND OPTICAL TRANSMISSION DEVICE USING SAME

CROSS REFERENCE TO RELATED APPLICATIONS

This application is a national stage completion application of PCT Application No. PCT/JP2022/002955, filed Jan. 26, 2022, and claims priority from Japanese Patent Application No. 2021-013606, filed Jan. 29, 2021. Each of these applications is incorporated by reference herein in its entirety.

TECHNICAL FIELD

The present invention relates to an optical modulator and an optical transmission device using the same and particularly, to an optical modulator including an optical control substrate that includes an optical waveguide including at least a branched waveguide which branches one light wave into two light waves, and that includes a control electrode for applying an electrical field to the branched waveguide, and a wiring substrate provided with wiring which relays an electrical signal to be applied to the control electrode.

BACKGROUND ART

In the field of optical communication or in the field of optical measurement, optical modulators using an optical control substrate that includes an optical waveguide and a control electrode which controls a light wave propagating through the optical waveguide have been widely used. In recent years, wider bandwidths or size reduction has been required for the optical modulators. For example, a plurality of different high-frequency signals are applied to one optical modulator at the same time.

Furthermore, in order to simplify a layout of electric wiring, relay substrates are used for applying electrical signals to each control electrode including a modulation electrode. As illustrated in FIG. 1 and in Patent Literature No. 1, electrical connection from a relay substrate 2 to an optical control substrate 1 employs only wire bonding WB because of easiness of wiring. However, as in a 96 GBaud-800 G modulator or the like, in an optical modulator having a frequency of higher than or equal to a few tens of GHz, particularly, exceeding 100 GHz, wire bonding increases propagation loss of the electrical signals.

In addition, as illustrated in FIG. 1, in a case of using a plurality of control electrodes (S1 to S4), a length of wiring from each input port disposed near a side edge of the optical control substrate in which the relay substrate is disposed to an action portion (the range indicated by arrow A on the left side of the dot-dashed line in FIG. 1), of each control electrode varies, and a difference in electrical characteristic occurs between each control electrode (each port).

In FIG. 2, optical input-output (Lin, Lout1, and Lout2) portions are provided on the same side surface of the optical control substrate 1 in order to achieve size reduction of the optical modulator. Even in such an optical modulator, a range from each input port to the action portion (the part indicated by arrow A) of each control electrode (S1 to S4) varies between each control electrode with respect to an input electrical signal Sin, and a difference in electrical characteristic occurs as in FIG. 1. In FIG. 2, only a signal electrode S is illustrated by a dotted line. Reference sign PD denotes photo detection means for detecting a part of radiated light radiated from a Y-junction of an optical waveguide OW.

In order to dispose the relay substrate along the side edge of the optical control substrate, a separate space in which the relay substrate is disposed needs to be secured, and it is difficult to achieve size reduction of a case accommodating the optical control substrate and the like. In addition, a space is also needed for path design for impedance adjustment in the relay substrate, and it is more difficult to achieve size reduction.

As a method for solving these problems, Patent Literature No. 2 suggests a structure in which the wiring substrate is disposed to overlap with the optical control substrate. However, in electrical connection between the wiring substrate and the optical control substrate, it is difficult to sufficiently secure electrical connection between the wiring substrate and the control electrode, particularly, between signal wiring and a signal electrode related to a modulation signal. That is, as illustrated in FIG. 2, in a case of sharply bending the optical waveguide for size reduction of the optical modulator, confinement of the light wave by the optical waveguide is strengthened. Thus, a thin plate rib structure in which a width or a thickness of the optical waveguide is set to be lower than or equal to approximately 1 μm is suggested. Thus, a clearance between electrodes for disposing the signal electrode and a ground electrode to sandwich the optical waveguide is narrow, and a width of the signal electrode is also significantly narrow. It is difficult to sufficiently secure an area of a connection part between the signal wiring of the wiring substrate and the signal electrode.

CITATION LIST

Patent Literature

[Patent Literature No. 1] Japanese Patent No. 5494704
[Patent Literature No. 2] Japanese Laid-open Patent Publication No. 2014-191250

SUMMARY OF INVENTION

Technical Problem

An object to be solved by the present invention is to solve the above problem and to provide an optical modulator with which electrical connection between a signal electrode and signal wiring of a wiring substrate can be reliably made even in a case where a width of the signal electrode in an action portion of an optical control substrate is narrow. In addition, another object is to provide an optical transmission apparatus using the optical modulator.

Solution to Problem

In order to solve the above objects, an optical modulator and an optical transmission device of the present invention have the following technical features.

(1) An optical modulator includes an optical control substrate that includes an optical waveguide including at least a branched waveguide which branches one light wave into two light waves, and that includes a control electrode for applying an electrical field to the branched waveguide, and a wiring substrate provided with a wiring which relays an electrical signal to be applied to the control electrode or with a wiring which terminates the electrical signal, in which the control electrode is provided with a signal electrode, the wiring is provided with signal wiring, and in a part in which electrical connection is made between the signal electrode and the signal wiring, a clearance in which the branched waveguide sandwiches the signal electrode is wider than a clearance in which the branched waveguide sandwiches the signal electrode in an action portion in which the control electrode applies the electrical field to the branched waveguide.

(2) In the optical modulator according to (1), both of the wiring which relays the electrical signal and the wiring which terminates the electrical signal are formed in the wiring substrate.

(3) In the optical modulator according to (1) or (2), in the part in which the electrical connection is made, the electrical connection is made using flip-chip connection.

(4) In the optical modulator according to any one of (1) to (3), the optical waveguide is formed to have a rib structure of a thin plate in which a height of a protruding portion is lower than or equal to 1 μm.

(5) In the optical modulator according to any one of (1) to (4), a driver circuit element that generates the electrical signal to be applied to the control electrode is disposed adjacent to the optical control substrate, and an output terminal of the driver circuit element is connected to the wiring of the wiring substrate.

(6) An optical transmission device includes the optical modulator according to any one of (1) to (5), and a signal generator that generates a modulation signal to be input into the driver circuit element.

Advantageous Effects of Invention

According to the present invention, in an optical modulator including an optical control substrate that includes an optical waveguide including at least a branched waveguide which branches one light wave into two light waves, and that includes a control electrode for applying an electrical field to the branched waveguide, and a wiring substrate provided with wiring which relays an electrical signal to be applied to the control electrode, the control electrode is provided with a signal electrode, the wiring is provided with signal wiring, and in a part in which electrical connection is made between the signal electrode and the signal wiring, a clearance in which the branched waveguide sandwiches the signal electrode is wider than a clearance in which the branched waveguide sandwiches the signal electrode in an action portion in which the control electrode applies the electrical field to the branched waveguide. Thus, a width of the signal electrode in the part in which the electrical connection is made between the signal electrode and the signal wiring can be sufficiently secured, and the electrical connection between both of the signal electrode and the signal wiring can be reliably made.

DESCRIPTION OF EMBODIMENTS

Hereinafter, the present invention will be described in detail using preferred examples.

Figure 3:
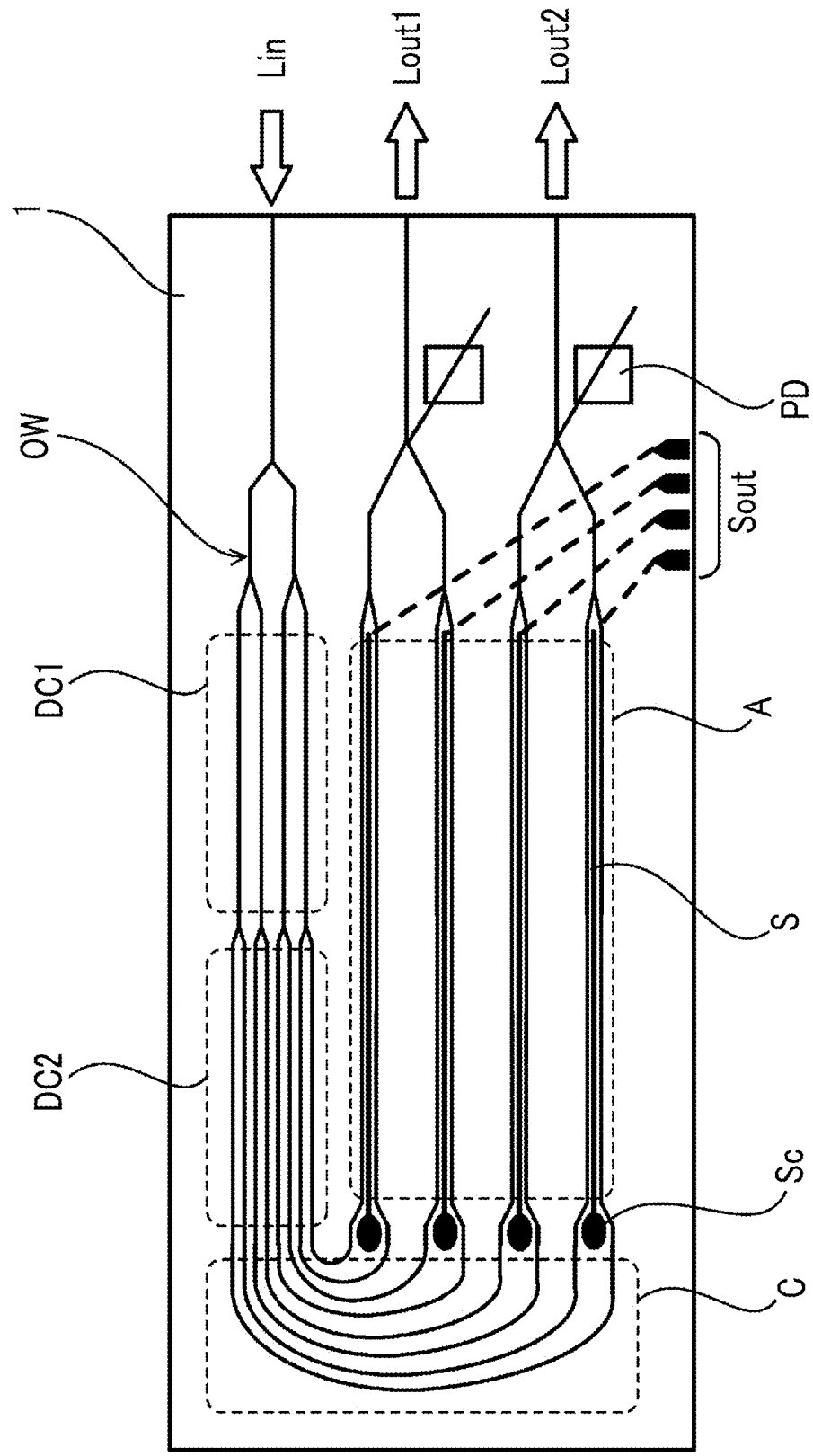
FIG. 3 is a diagram illustrating an example of an optical modulator according to the present invention.
Figure 4:
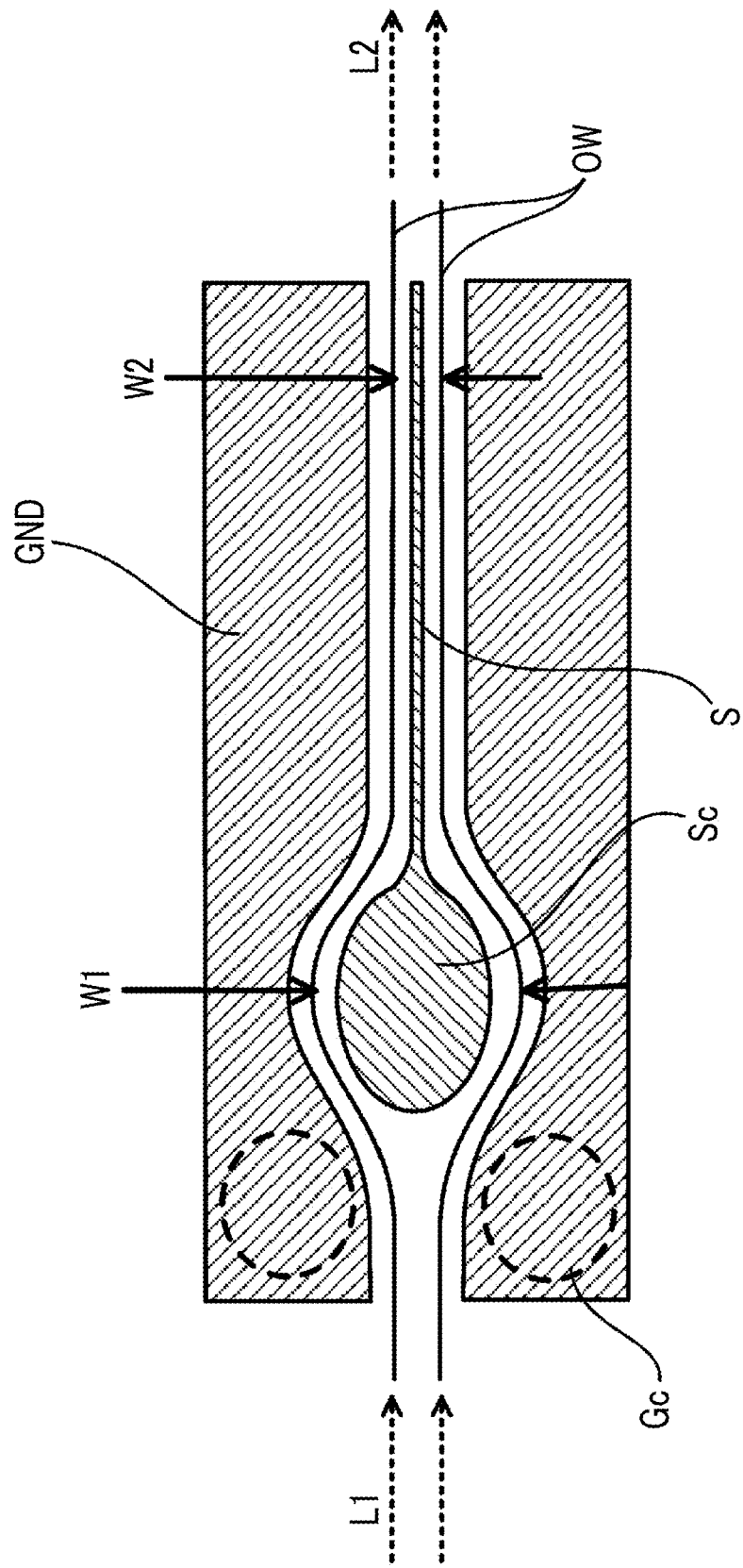
FIG. 4 is an enlarged view of a part Sc in which an electrical signal is input in a control electrode in FIG. 3.

As illustrated in FIGS. 3 to 8, the present invention is characterized by an optical modulator including an optical control substrate 1 that includes an optical waveguide OW including at least a branched waveguide which branches one light wave into two light waves, and that includes a control electrode for applying an electrical field to the branched waveguide, and a wiring substrate (20, 21) provided with wiring which relays an electrical signal to be applied to the control electrode or with wiring which terminates the electrical signal, in which the control electrode includes a signal electrode S, the wiring includes signal wiring, and, as illustrated in FIG. 4, in a part (a signal electrode side is denoted by Sc) in which electrical connection is made between the signal electrode and the signal wiring, a clearance W1 in which the branched waveguide sandwiches the signal electrode is wider than a clearance W2 in which the branched waveguide sandwiches the signal electrode in an action portion (reference sign A) in which the control electrode applies the electrical field to the branched waveguide.

Figure 5:
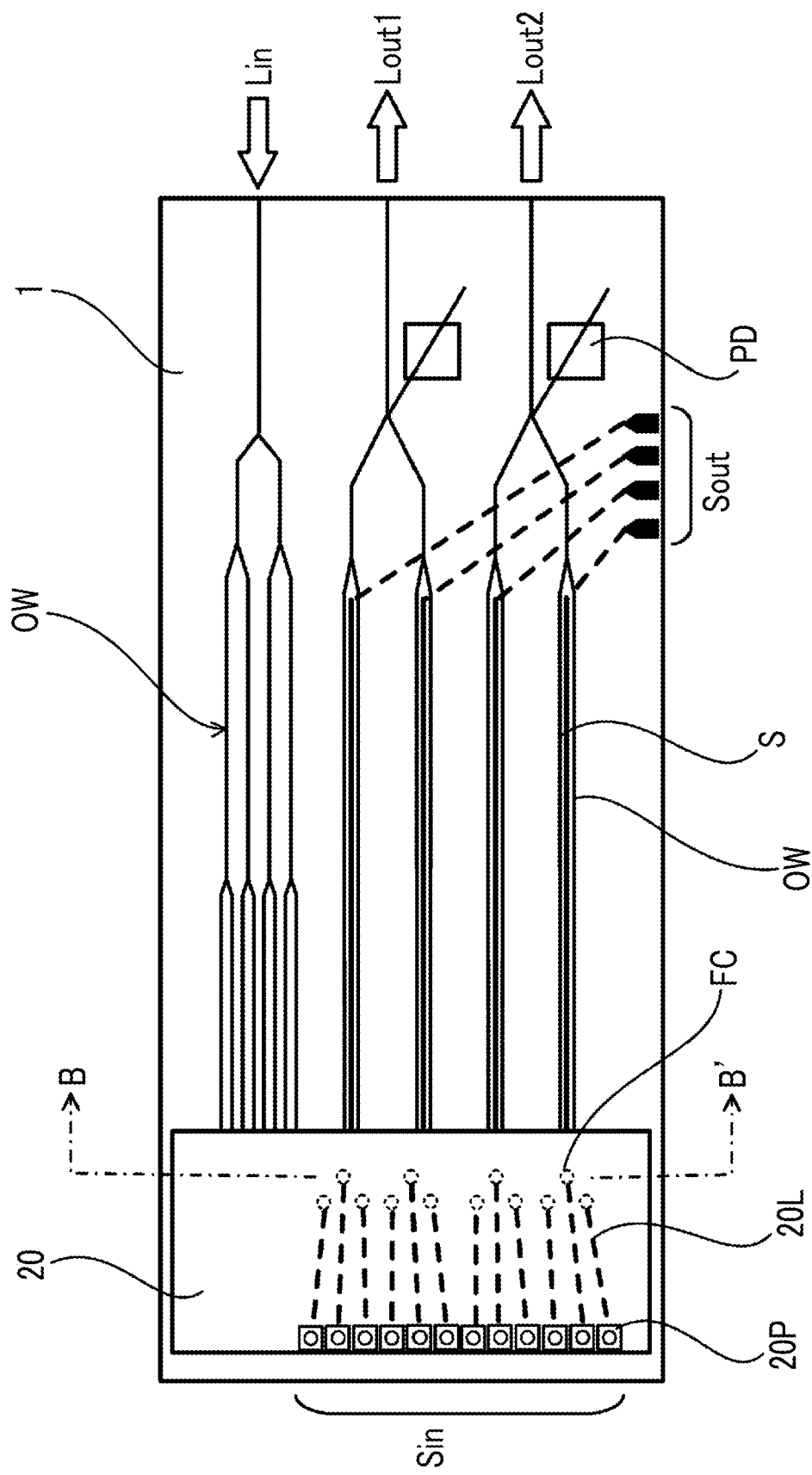
FIG. 5 is a diagram illustrating a state where a wiring substrate (relay substrate) 20 is overlaid on an optical control substrate 1 of the optical modulator in FIG. 3.

FIG. 3 is a diagram illustrating the optical control substrate 1 constituting the optical modulator according to the present invention. In the optical control substrate 1, the optical waveguide OW and the control electrode (signal electrode S; a ground electrode is not illustrated) are formed. FIG. 4 is an enlarged view of a part in which an electrical signal of the signal electrode S in FIG. 3 is input. Furthermore, FIG. 5 illustrates a state where the wiring substrate (relay substrate 20) including a path for relaying the electrical signal is disposed to overlap with the optical control substrate 1 in FIG. 4. In addition, FIG. 6 illustrates a part of a cross section view along dot-dashed line B-B' in FIG. 5.

As the optical control substrate 1 including the optical waveguide OW, while a ferroelectric substrate of lithium niobate (LN), lithium tantalate (LT), lead lanthanum zirconate titanate (PLZT), or the like having an electro-optic effect can be used, a reinforcing substrate on which a vapor phase growth film of these materials is formed can also be used. Furthermore, a substrate using various materials such as a semiconductor material such as InP or an organic material can also be used. Quartz, crystal, or the like can be used in the reinforcing substrate.

Figure 6:
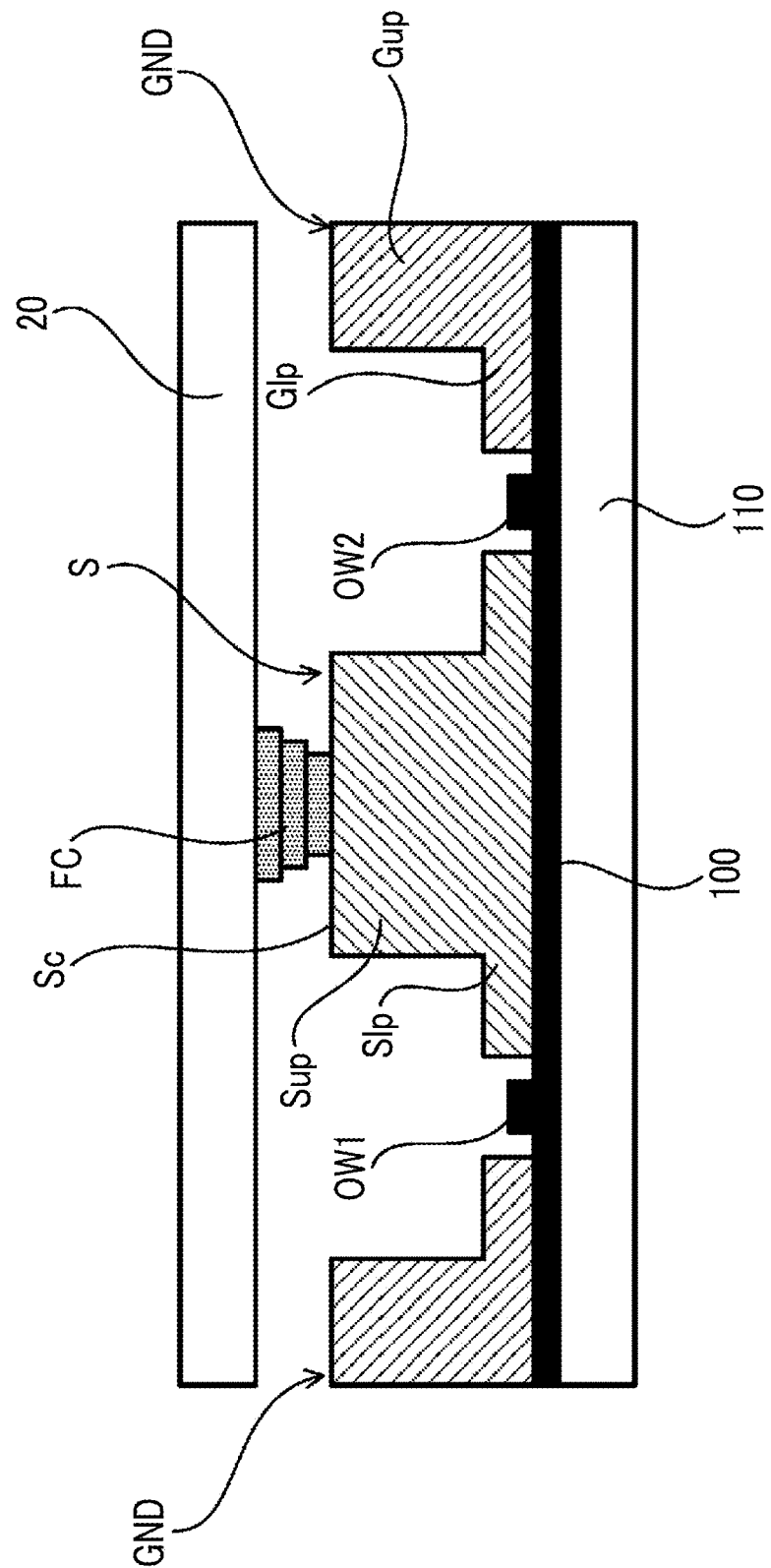
FIG. 6 is a cross section view illustrating a situation of electrical connection between a signal electrode and the wiring substrate in FIG. 5.

As a method for forming the optical waveguide, as illustrated in FIG. 6, a rib type optical waveguide in which a part corresponding to the optical waveguide has a protruding shape by, for example, etching a substrate surface other than the optical waveguide (OW1, OW2) or by forming grooves on both sides of the optical waveguide can be used in the substrate. Furthermore, a composite optical waveguide can also be used by, for example, forming a high-refractive index part on the substrate surface with Ti or the like using a thermal diffusion method, a proton conversion method, or the like in addition to the formation of the rib type optical waveguide.

A substrate 100 in which the optical waveguide is formed is configured to have a thickness of lower than or equal to 5 µm and more preferably lower than or equal to 3 µm as a thin plate in order to achieve velocity matching between a microwave of a modulation signal and a light wave. Methods for forming the thin plate include a method of thin polishing in a state where the substrate 100 is directly bonded to a reinforcing substrate 110 or a method of forming the substrate 100 on the reinforcing substrate 110 as a vapor phase growth film. A height of the rib type optical waveguide (OW1, OW2) is set to be lower than or equal to 2 µm and more preferably lower than or equal to 1 µm.

The control electrode that applies the electrical field to the optical waveguide (OW1, OW2) is a combination of a signal electrode and a ground electrode through which a microwave electrical signal such as the modulation signal propagates, a bias electrode that applies a DC bias voltage, or the like. As a method for forming the control electrode along the optical waveguide, the control electrode can be configured by laminating an underlying metal of Au, Ti, or the like with Au using a plating method.

As illustrated in FIG. 6, in a case where the optical waveguide (OW1, OW2) has a rib structure of a thin plate in which a height of a protruding portion is lower than or equal to 1 µm, a structure for applying an efficient electrical field to the optical waveguide and a structure for achieving matching between propagation velocities of the electrical signal and the light wave and for reducing propagation loss of the electrical signal need to be considered for the control electrode, particularly, for a modulation electrode formed with the signal electrode S and a ground electrode GND. Thus, lower electrode portions (Slp and Glp) are provided in the signal electrode S and in the ground electrode GND, respectively, and these lower electrode portions are disposed close to the optical waveguide (OW1, OW2). In addition, upper electrode portions (Sup and Gup) having narrower widths than the lower electrode portions are disposed above the lower electrode portions (Slp and Glp) to increase a clearance between the signal electrode S and the ground electrode GND. In addition, for example, heights of the upper electrode portions are set to be higher than or equal to a few tens of µm to secure a sufficient cross section area in the signal electrode and the like.

FIG. 3 is a plan view illustrating an example of the optical control substrate 1 used in the optical modulator of the present invention. In the optical waveguide OW, eight branched waveguides are formed through three stages of branching parts, and then, two beams of output light (Lout1, Lout2) are configured to be finally output through two stages of Y-junctions from input light Lin.

DC1 and DC2 of dotted line frames indicate regions in which DC bias electrodes for performing a bias control are disposed. Reference sign C denotes a region in which the optical waveguide is bent. By setting a height or a width of the optical waveguide to be lower than or equal to 1 µm in the region, confinement of light can be strengthened, and a radius of curvature can be decreased. A region of a dotted line frame A indicates an action portion in which the control electrode (modulation electrode) applies the electrical field to the optical waveguide (branched waveguide). PD denotes a light-receiving element that receives a part of the output light (Lout1, Lout2) before output. Instead of such a light-receiving element, a light-receiving element can also be disposed to receive radiation mode light in a Y-junction as in the technology well known to those skilled in the art.

In FIG. 3, only the signal electrode S in the control electrode is explicitly illustrated. An input part Sc of the signal electrode S is configured as a part thicker than a width of the signal electrode in the action portion as illustrated in the enlarged view in FIG. 4. This part functions as a connection part on the signal electrode side in making flip-chip connection as will be described later. As illustrated in FIG. 4, a clearance of the branched waveguide (OW) is also wide in accordance with the wide width of the electrical connection part Sc of the signal electrode S. Thus, in the connection part Sc of the signal electrode, the clearance W1 in which the branched waveguide (OW) sandwiches the signal electrode S is wider than the clearance W2 in which the branched waveguide sandwiches the signal electrode S in the action portion A. Accordingly, the reason why the optical waveguide can be sharply bent is also because the confinement of the light by the optical waveguide is strong as described above.

In FIG. 4, the ground electrode GND is also explicitly illustrated as sandwiching the signal electrode S. Even in the ground electrode, electrical connection to the wiring (ground wiring) of the wiring substrate is necessary as in the signal electrode. In FIG. 4, a connection part of the ground electrode is explicitly illustrated by a dotted line Gc. Generally, the electrical signal can be more stably moved by connecting the ground electrode first and then, by connecting the signal electrode in an advancing direction of the modulation signal. Further preferably, a plurality (for example, four) of connection parts of the ground electrode can also be provided to sandwich before and after the connection part of the signal electrode in the advancing direction of the modulation signal. L1 denotes light input into the branched waveguide, and L2 denotes light propagating through the branched waveguide.

While the input part Sc of the signal electrode S is configured as a part thicker than the width of the signal electrode in the action portion, a thickness of the input part Sc may be further increased (for example, a thickness of 5 µm to 30 µm). By increasing the thickness, breaking or peeling of the signal electrode in making the flip-chip connection can be prevented, and connection strength can be increased.

Making the flip-chip connection can improve the propagation loss of the electrical signal, compared to wire bonding connection. In addition, by making the flip connection, lengths of wiring of a plurality of signal electrodes can be made uniform to a certain degree. Thus, a difference in electrical characteristic between each control electrode can be reduced.

The wiring substrate (relay substrate) 20 illustrated in FIG. 5 is used for inputting the electrical signal into the signal electrode S. The wiring substrate 20 is disposed to overlap with the optical control substrate 1 in order to reduce a size of a case accommodating the optical control substrate. As an example of the wiring substrate 20, an input pad portion 20P is formed along one side edge of the wiring substrate 20, and the input pad portion 20P is electrically connected to wiring 20L disposed on a lower surface (a surface on the optical control substrate side) of the wiring substrate 20. The wiring 20L includes signal wiring and ground wiring. In a flip-chip connection part FC, an other end of the wiring 20L is electrically connected to the connection part Sc of the signal electrode and to the connection part Gc of the ground electrode illustrated in FIG. 3 or FIG. 4. FIG. 6 illustrates a state of connection between the signal electrode S and the wiring substrate 20 side (the signal wiring is not illustrated) by the flip-chip connection part FC. For example, a size of the flip-chip connection is approximately 30 to 60 µm in width. The width of the connection part of the signal electrode is also set to approximately 30 to 80 µm in accordance with the size.

Figure 1:
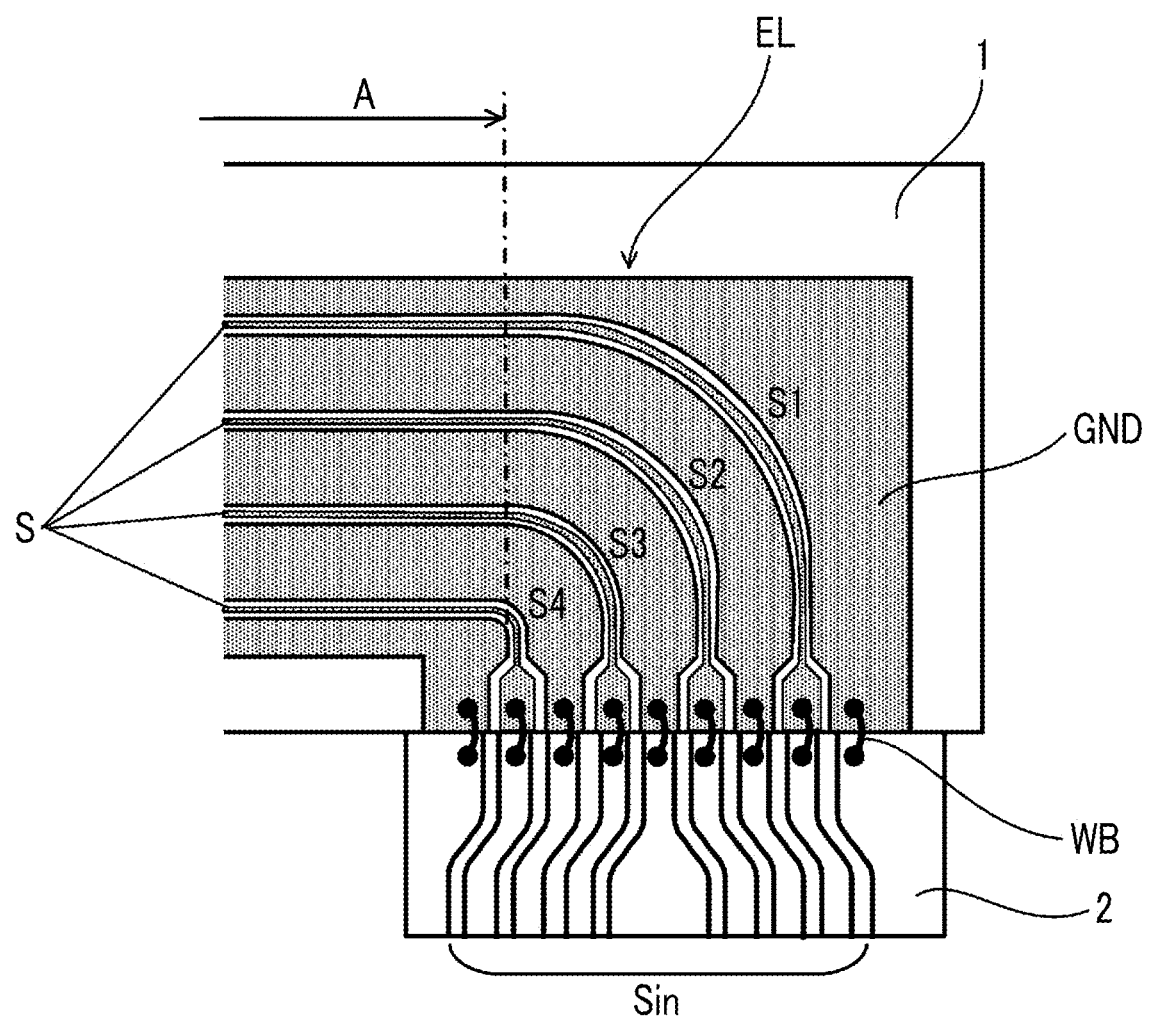
FIG. 1 is a diagram illustrating an example of an optical modulator in the related art.
Figure 2:
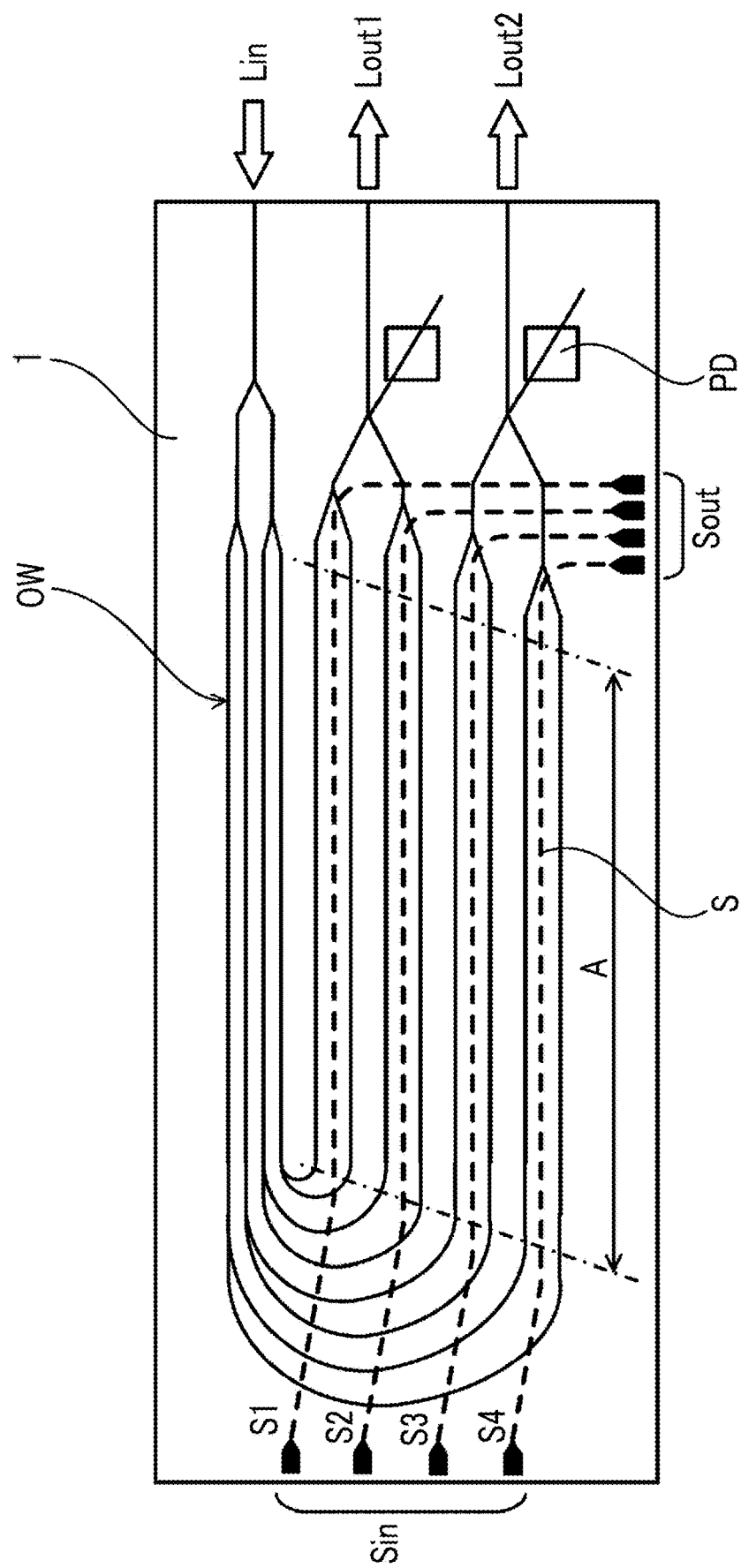
FIG. 2 is a diagram illustrating another example of the optical modulator in the related art.
Figure 7:
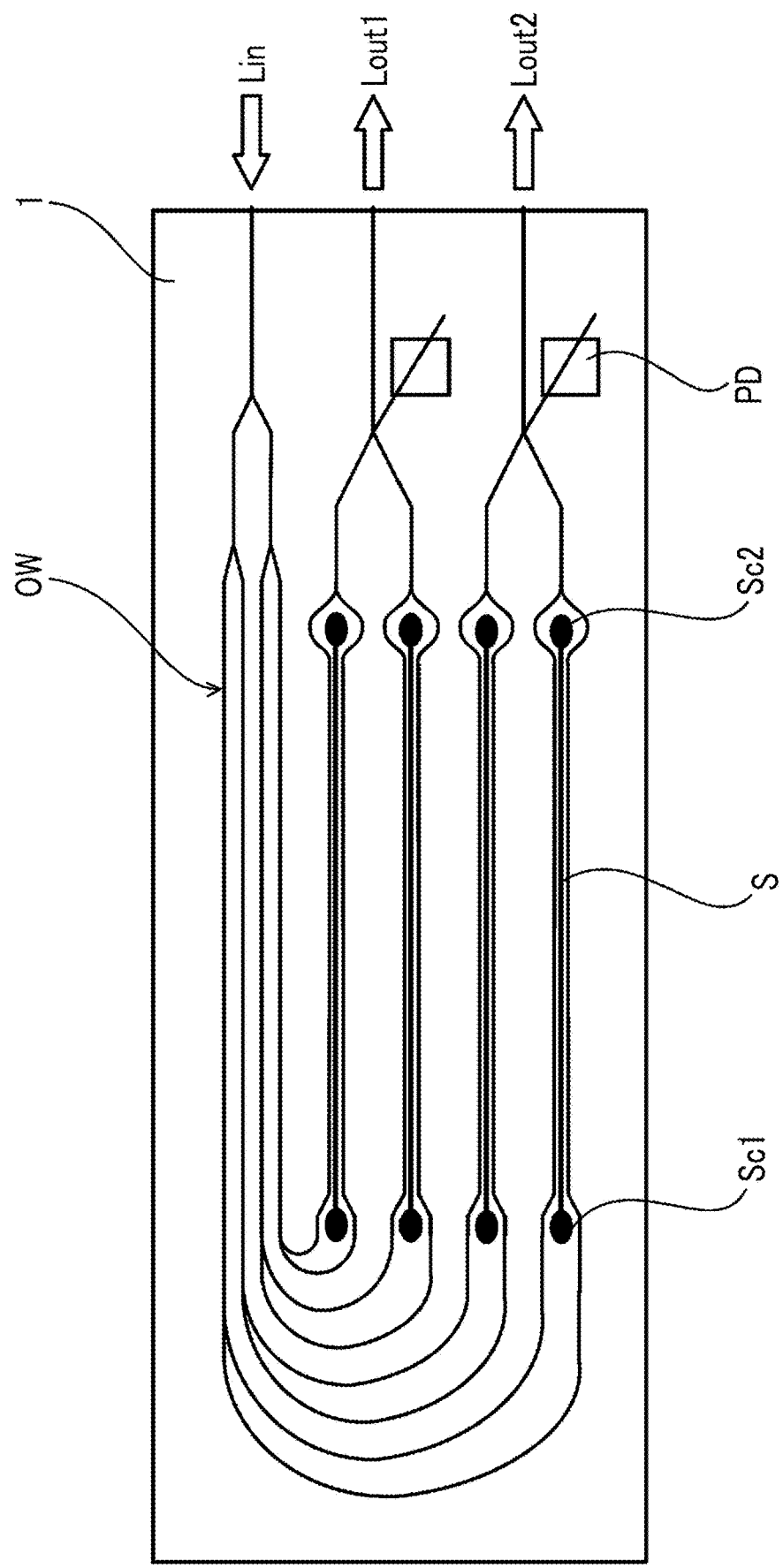
FIG. 7 is a diagram illustrating another example of the optical modulator according to the present invention.

After the action portion A, a configuration of the signal electrode S in FIG. 3 is configured to be connected to an output pad part disposed along a side edge of the optical control substrate 1 and to output (Sout) the electrical signal (modulation signal) to an outside as in the example of the related art in FIG. 2. On the other hand, in FIG. 7 and in FIG. 8, a part (connection part Sc2) thicker than the action portion can also be formed in an end portion of the signal electrode on the output side and be configured to be directly electrically connected to the wiring substrate (termination substrate) 21. FIG. 7 is a modification example of FIG. 3, and FIG. 8 is a modification example of FIG. 5.

Figure 8:
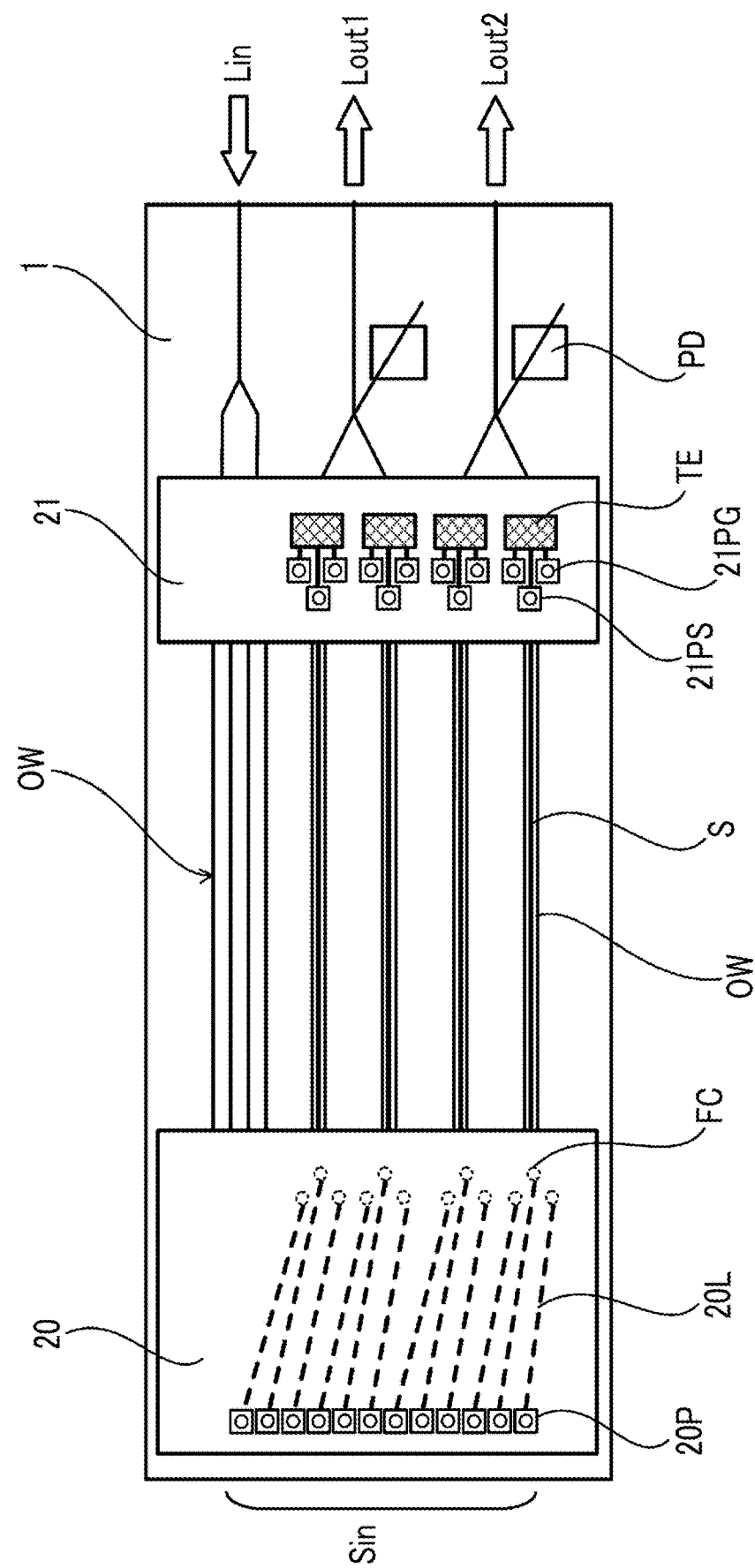
FIG. 8 is a diagram illustrating a state where the wiring substrate (relay substrate) 20 and a wiring substrate (termination substrate) 21 are overlaid on the optical control substrate 1 of the optical modulator in FIG. 7.

Reference sign 21 in FIG. 8 denotes the termination substrate. An output pad portion 21PS connected to the signal electrode is formed in the termination substrate. In addition, an output pad portion 21PG connected to the ground electrode can also be provided. On the output side of the signal electrode S, generally, radiation of the modulation signal from the signal electrode can be suppressed by connecting the signal electrode first and then, by connecting the ground electrode in the advancing direction of the modulation signal. Further preferably, a plurality (for example, four) of connection parts of the ground electrode can also be provided to sandwich before and after the connection part of the signal electrode in the advancing direction of the modulation signal. A termination element TE such as a termination resistor is provided in the termination substrate 21 and is electrically connected to the output pad portion (21PS, 21PG).

While the termination substrate 21 is provided separately from the relay substrate 20 in FIG. 8, both can also be integrated to form the wiring substrate. Of course, in the optical modulator of the present invention, it is also possible to configure the relay substrate as in the related art and to dispose only the termination substrate to overlap with the optical control substrate 1 as in FIG. 8. In addition, in a case where the light-receiving element PD is disposed close to the wiring substrate, a shape of the wiring substrate and disposition of the light-receiving element may be set such that the wiring substrate (20, 21) does not overlap with the light-receiving element PD. The light-receiving element PD not only detects radiated light from the Y-junction of the optical waveguide OW but also can be configured to detect a part of the light wave propagating through the optical waveguide OW by branching the part of the light wave.

Figure 9:
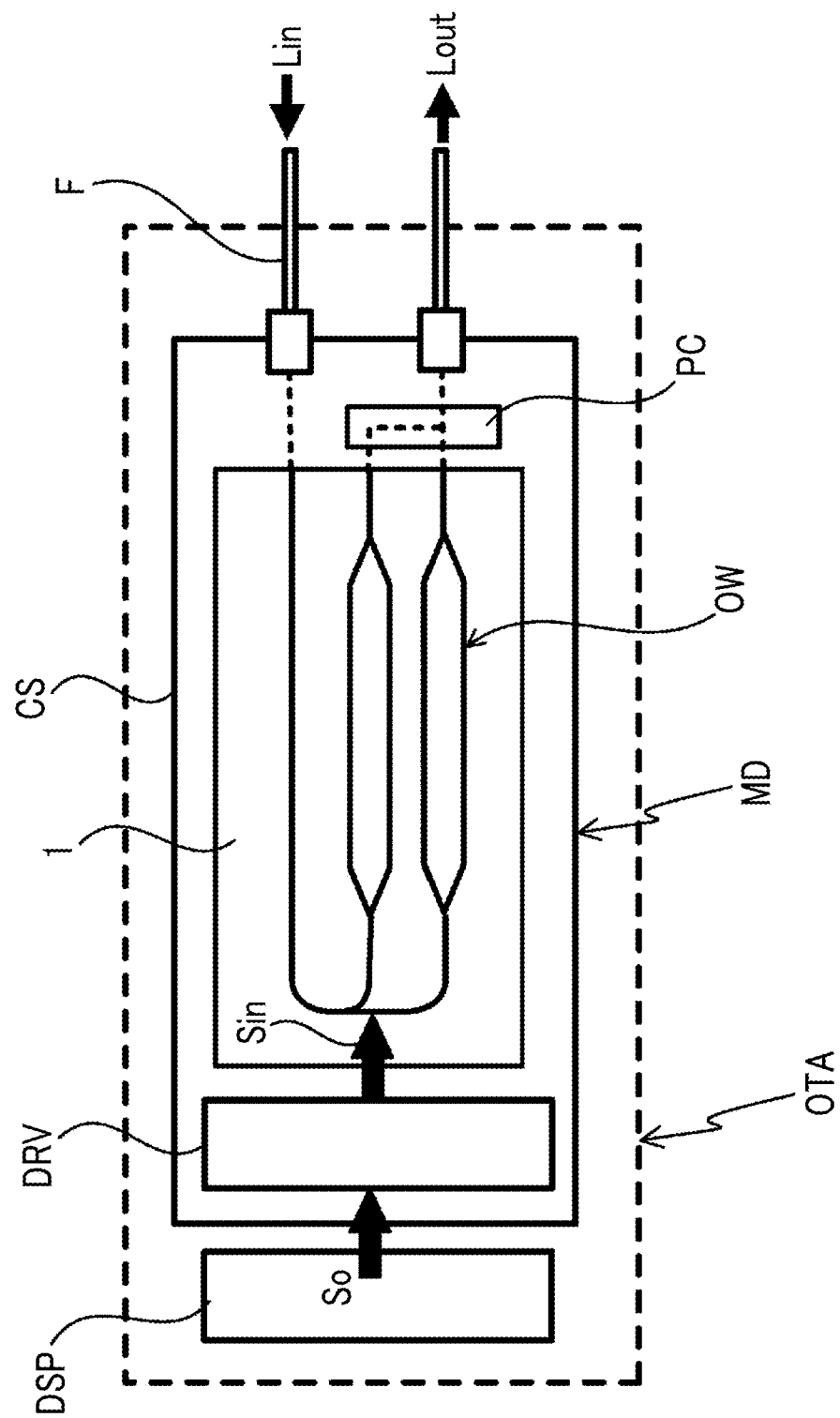
FIG. 9 is a diagram illustrating an optical transmission device according to the present invention.

FIG. 9 is a diagram illustrating an example of an optical transmission device.

In the optical modulator, a driver circuit element DRV that generates the electrical signal to be applied to the control electrode is disposed adjacent to the optical control substrate 1. An output terminal of the driver circuit element is connected to the wiring of the wiring substrate 20. The input light Lin is input into the optical control substrate 1 in FIG. 9 through an optical component such as a lens using an optical fiber F. On the other hand, for example, the light wave output from the optical control substrate 1 is combined through polarization combining means PC and is input into another optical fiber through an optical component such as lens to be output light Lout.

Furthermore, a signal generator DSP that generates a modulation signal S0 to be input into the driver circuit element DRV can be provided to be configured as the optical transmission device. The optical modulator and the driver circuit element can be incorporated in a case CS, and the case CS and the signal generator DSP can be further incorporated in one chassis.

INDUSTRIAL APPLICABILITY

As described above, according to the present invention, it is possible to provide an optical modulator with which electrical connection between a signal electrode and signal wiring of a wiring substrate can be reliably made even in a case where a width of the signal electrode in an action portion of the optical control substrate is narrow. In addition, it is also possible to provide an optical transmission apparatus using the optical modulator.

REFERENCE SIGNS LIST

1: optical control substrate
20: wiring substrate (relay substrate)
21: wiring substrate (termination substrate)
S: signal electrode
Sc: connection part of signal electrode
GND: ground electrode
Gc: connection part of ground electrode
OW: optical waveguide

The invention claimed is:

1. An optical modulator comprising:
an optical control substrate that includes an optical waveguide including at least a branched waveguide which branches one light wave into two light waves, and that includes a control electrode for applying an electrical field to the branched waveguide; and
a wiring substrate provided with a wiring which relays a modulation signal to be applied to the control electrode,
wherein the control electrode is provided with a signal electrode and a ground electrode sandwiching the signal electrode,
the wiring is provided with signal wiring and ground wiring,
two waveguides of the branched waveguide sandwich the signal electrode,
in a part in which electrical connection is made between the signal electrode and the signal wiring, a distance between the two waveguides sandwiching the signal electrode is wider than a distance between the same two waveguides sandwiching the signal electrode in an action portion in which the control electrode applies the electrical field to the branched waveguide, and
in the part, in the direction in which the modulation signal travels, the ground electrode and the ground wiring are first electrically connected, and then the signal electrode and the signal wiring are electrically connected.

2. The optical modulator according to claim 1, wherein both of the wiring which relays the modulation signal and a wiring which terminates the modulation signal are formed in the wiring substrate.

3. The optical modulator according to claim 1, wherein in the part in which the electrical connection is made, the electrical connection is made using flip-chip connection.

4. The optical modulator according to claim 1, wherein the optical waveguide is formed to have a rib structure of a thin plate in which a height of a protruding portion is lower than or equal to 1 µm.

5. The optical modulator according to claim 1, wherein a driver circuit element that generates the electrical signal to be applied to the control electrode is disposed adjacent to the optical control substrate, and an output terminal of the driver circuit element is connected to the wiring of the wiring substrate.

6. An optical transmission device comprising:

the optical modulator according to claim 5; and
a signal generator that generates a modulation signal to be input into the driver circuit element.

7. An optical modulator comprising:

an optical control substrate that includes an optical waveguide including at least a branched waveguide which branches one light wave into two light waves, and that includes a control electrode for applying an electrical field to the branched waveguide; and a wiring substrate provided with a wiring which terminates a modulation signal to be applied to the control electrode, wherein the control electrode is provided with a signal electrode and a ground electrode sandwiching the signal electrode, the wiring is provided with signal wiring and ground wiring, two waveguides of the branched waveguide sandwich the signal electrode, in a part in which electrical connection is made between the signal electrode and the signal wiring, a distance between the two waveguides sandwiching the signal electrode is wider than a distance between the same two waveguides sandwiching the signal electrode in an action portion in which the control electrode applies the electrical field to the branched waveguide, and in the part, in the direction in which the modulation signal travels, the signal electrode and the signal wiring are first electrically connected, and then the ground electrode and the ground wiring are electrically connected.

* * * * *